United States Patent
Thomas et al.

(10) Patent No.: US 6,181,688 B1
(45) Date of Patent: *Jan. 30, 2001

(54) SYSTEM, DEVICE, AND METHOD FOR CONSOLIDATING FRAME INFORMATION INTO A MINIMUM NUMBER OF OUTPUT LINKS

(75) Inventors: Shaji Thomas, McKinney; Neil D. Salisbury; Paul R. Frazier, both of Dallas; William C. Tucker, Plano; Michael H. Jette, Grapevine, all of TX (US)

(73) Assignee: Alcatel USA Sourcing, L.P., Plano, TX (US)

( * ) Notice: Under 35 U.S.C. 154(b), the term of this patent shall be extended for 0 days.

This patent is subject to a terminal disclaimer.

(21) Appl. No.: 09/283,568

(22) Filed: Mar. 31, 1999

Related U.S. Application Data

(63) Continuation of application No. 08/777,775, filed on Dec. 31, 1996, now Pat. No. 5,974,050.

(51) Int. Cl.[7] ............ H04L 12/28; H04L 12/56; H04J 3/16; H04J 3/22
(52) U.S. Cl. ............ 370/351; 370/396; 370/422; 370/466
(58) Field of Search .................... 370/351, 396, 370/401, 352, 395, 410, 353, 422, 466, 229, 230; 375/308, 222, 279

(56) References Cited

U.S. PATENT DOCUMENTS

| | | | |
|---|---|---|---|
| 4,685,101 | * 8/1987 | Segal et al. ............ | 370/84 |
| 5,337,306 | 8/1994 | Hall ............ | 370/13 |
| 5,434,850 | * 7/1995 | Fielding et al. ............ | 370/50 |
| 5,499,251 | 3/1996 | Thompson et al. ............ | 370/73 |
| 5,691,976 | 11/1997 | Engdahl et al. ............ | 370/242 |
| 5,734,654 | * 3/1998 | Shirai et al. ............ | 370/396 |
| 5,825,829 | * 10/1998 | Borazjani et al. ............ | 375/308 |
| 5,956,334 | * 9/1999 | Chu et al. ............ | 370/352 |

FOREIGN PATENT DOCUMENTS 2280337   1/1995 (GB) ............ H04J/3/00

OTHER PUBLICATIONS

S.P. Ferguson, "Implications of Sonet and SDH", Electronics & Communication Engineering Journal, vol. 6, No. 3, Jun. 1994, pp. 133–142.

* cited by examiner

Primary Examiner—Huy D. Vu
Assistant Examiner—M. Phan
(74) Attorney, Agent, or Firm—Baker Botts L.L.P.

(57) ABSTRACT

A telecommunications network (12) includes a digital cross-connect system (10) that receives frame relay information carried in individual DS-0 signals over DS-0 links (14) and/or multiple DS-0 signals over FT-1 links (16). The digital cross-connect system (10) includes a cross-connect matrix (44) that consolidates DS-0 signals into DS-1 signals. The digital cross-connect system (10) further includes a frame groomer (40) that extracts frames from each DS-0 signal for consolidation into a frame groomed consolidated circuit. The frame groomed consolidated circuit is transferred to an edge switch (24) in DS-1 signals through the frame groomer (40) and the cross-connect matrix (44).

28 Claims, 3 Drawing Sheets

- CONSOLIDATE FRAMES FROM MULTIPLE TDM CIRCUITS IN TO ONE TDM CIRCUIT

SYSTEM, DEVICE, AND METHOD FOR CONSOLIDATING FRAME INFORMATION INTO A MINIMUM NUMBER OF OUTPUT LINKS

This application is a continuation U.S. application Ser. No. 08/777,775 filed Dec. 31, 1996, now U.S. Pat. No. 5,974,050.

TECHNICAL FIELD OF THE INVENTION

The present invention relates in general to telecommunications networks and more particularly to a grooming device and method for consolidating information onto a minimum number of output links.

BACKGROUND OF THE INVENTION

Frame relay service providers, as well as asynchronous transfer mode service providers, require a sufficient number of ports in order to provide frame relay, and asynchronous transfer mode, services. However, these ports are extremely expensive to obtain compared to ports for a conventional cross-connect systems. Further, time division multiplexed links that provide access to frame relay services are extremely under-utilized due to the bursty nature of the information being transferred. The frame relay traffic is carried on fully allocated digital circuits such as DS-0, nxDS-0, Ti, E1, T3, E3, et al. As a result, the variable bit rate characteristic of the frame relay traffic is not effectively exploited. Therefore, it is desirable to improve the efficiency of frame relay traffic transfer that would reduce the number of frame relay or asynchronous transfer mode ports required by the service provider.

SUMMARY OF THE INVENTION

From the foregoing, it may be appreciated that a need has arisen for an effective technique for transferring frame relay and asynchronous transfer mode traffic in order to reduce the number of ports required in handling this traffic. In accordance with the present invention, a system, device, and method for consolidating information onto a minimum number of output links are provided that substantially reduce or eliminate disadvantages and problems associated with conventional frame relay and asynchronous transfer mode traffic transfer and processing.

According to an embodiment of the present invention, there is provided a digital cross-connect system that includes an input port operable to receive digital signal level zero telecommunications signals from a plurality of input ports. The digital signal level zero telecommunications signals are consolidated into a minimum number of digital signal level one telecommunications signals by a cross-connect matrix. A frame groomer identifies frame relay traffic in the digital signal level zero telecommunications signals and consolidates the frame relay traffic into a minimum number of digital signal level zero telecommunications signals. An output port transfers the digital signal level one telecommunications signals carrying the consolidated frame relay traffic onto an output link. (Complete according to claim 1 to be done).

The present invention provides various technical advantages over conventional frame relay and asynchronous transfer mode traffic transfer and processing techniques. For example, one technical advantage is to consolidate frame relay or asynchronous transfer mode traffic onto preferably a single output link. Another technical advantage is to reduce the number of ports required to receive and transfer frame relay or asynchronous transfer mode traffic. Yet another technical advantage is to select frames from a plurality of input links for placement onto a consolidated output link. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
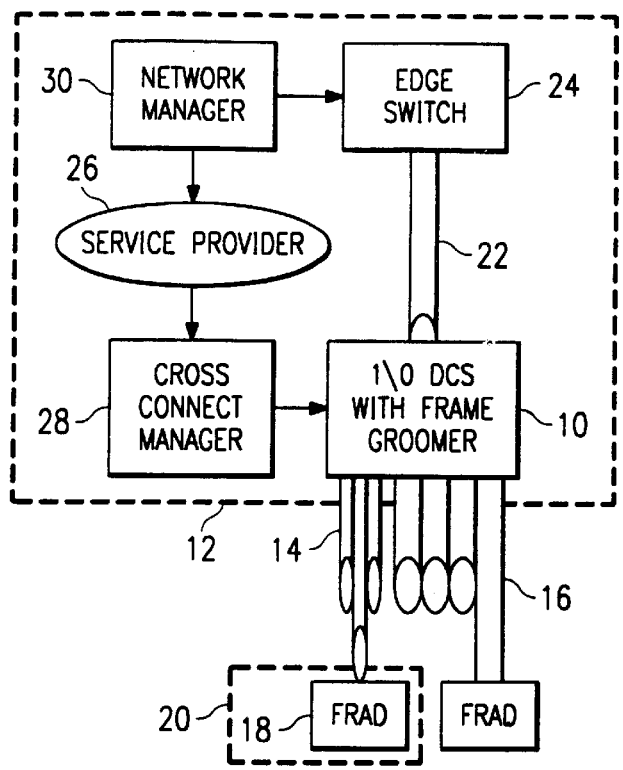
FIG. 1 illustrates a block diagram of a digital cross-connect system within a telecommunications network.

FIG. 1 is a block diagram of a digital cross-connect system 10 within a telecommunications network 12. Telecommunications network 12 preferably provides a frame relay permanent virtual connection exchange service. In a frame relay permanent virtual connection service, variable length frames are relayed from the source to the desired destination by means of permanent virtual connections. Each frame is addressed by a unique data link connection identifier which is associated with a particular permanent virtual connection connecting two end systems. Permanent virtual connections that define the logical paths between endpoints in a customer's network are established at service subscription time through administrative procedures.

In the downstream direction, digital cross-connect system 10 receives individual DS-0 signals carried over T-1 links 14 and/or multiple DS-0 signals carried over FT-1 links 16 from frame relay assembly/disassembly devices 18 of frame relay customers 20. Digital cross-connect system 10 extracts the frames making up the frame relay traffic from the DS-0 signals and consolidates the frames by multiplexing them into DS-1 signals onto an output link 22 for transfer to an edge switch 24. In the upstream direction, digital cross-connect system 10 demultiplexes frames received within DS-1 signals transferred by edge switch 24 over output link 22. The frames are then placed into DS-0 signals for transfer to frame relay assembly/disassembly devices 18 of frame relay customers 20 over T-1 links 14 and/or FT-1 links 16. Administration procedures for defining consolidation and permanent virtual connections is determined by a service provider 26 through provisioning criteria programmed into a cross-connect manager 28 in response to digital link connection identifiers determined by a frame relay network manager 30.

Figure 2:
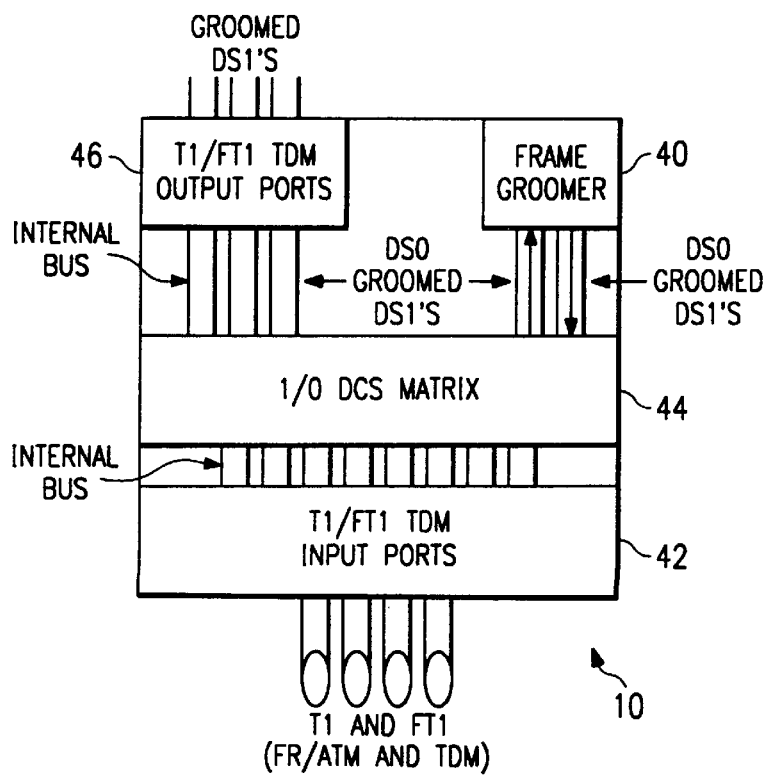
FIG. 2 illustrates a block diagram of a frame groomer within the digital cross-connect system.

FIG. 2 shows an operation of a frame groomer 40 within digital cross-connect system 10. Digital cross-connect system 10 receives frame relay information carried in individual or multiple DS-0 signals over T-1 links 14 and/or FT-1 links 16 at TDM input ports 42. The DS-0 signals pass through TDM input ports 42 over an internal bus to a cross-connect matrix 44. Cross-connect matrix 44 consolidates the DS-0 signals into internal data bus format. DS-0 signals identified as carrying frame relay information are carried over the internal data bus to frame groomer 40. Frame groomer 40 uses frame relay virtual circuit parameters and frame parameters to extract frames from each DS-0 signal within the internal data bus. The extracted frames are consolidated onto a frame relay groomed consolidated circuit carried in the internal data that are returned to cross-connect matrix 44 over the internal bus. Cross-connect matrix 44 sends the internal data signals carrying the frame groomed consolidated circuit over the internal bus to TDM output ports 46. TDM output ports 46 transfer the DS-1 signals over T-1 links to edge switch 24.

Figure 3:
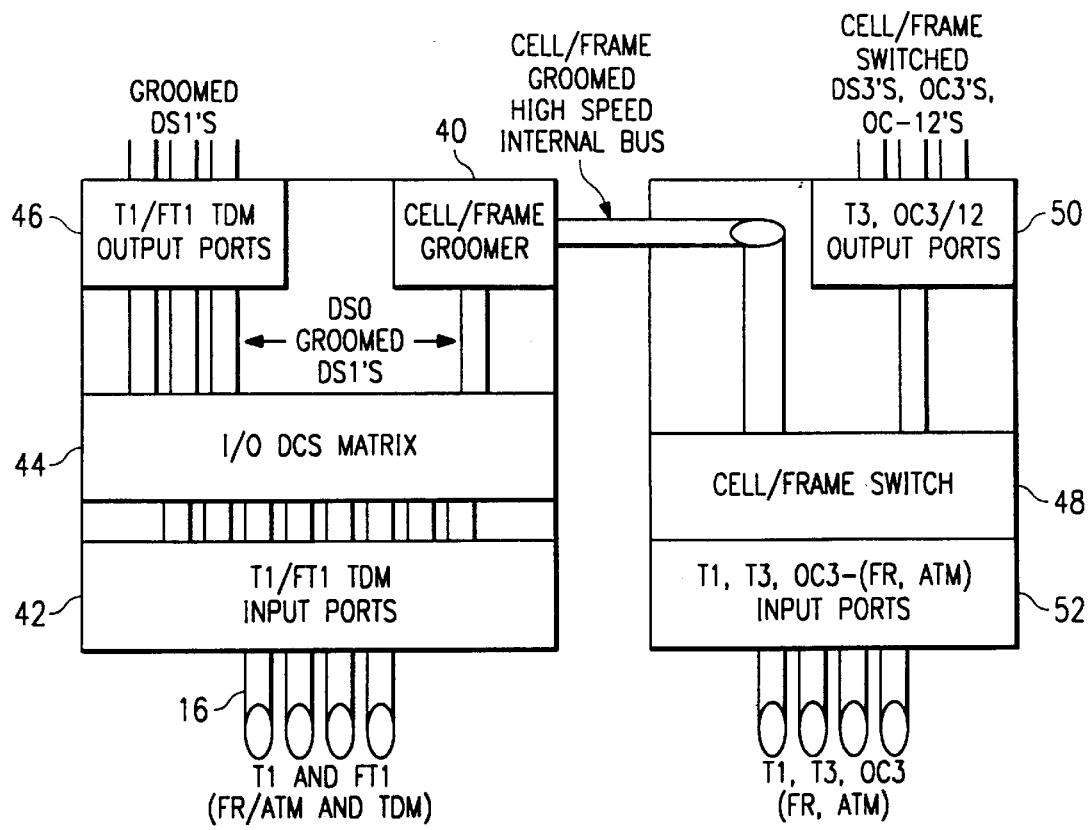
FIG. 3 illustrates an extension for the frame groomer to accommodate higher bandwidths.

FIG. 3 shows an extension of frame groomer 40 to higher bandwidth capability. Once frame groomer 40 generates the frame relay consolidated circuit, DS-0 signals carrying the frame relay consolidated circuit are transferred over a high speed internal bus to a frame switch 48. Frame switch 48 places the DS-1 signals into DS-3 signals for transfer to the network through high bandwidth output ports 50. Frame switch 48 can also process frame relay information received at high bandwidth input ports 52 for transfer to the network through high bandwidth output ports 50 or through frame groomer 40 and digital cross-connect system 10.

Figure 4:
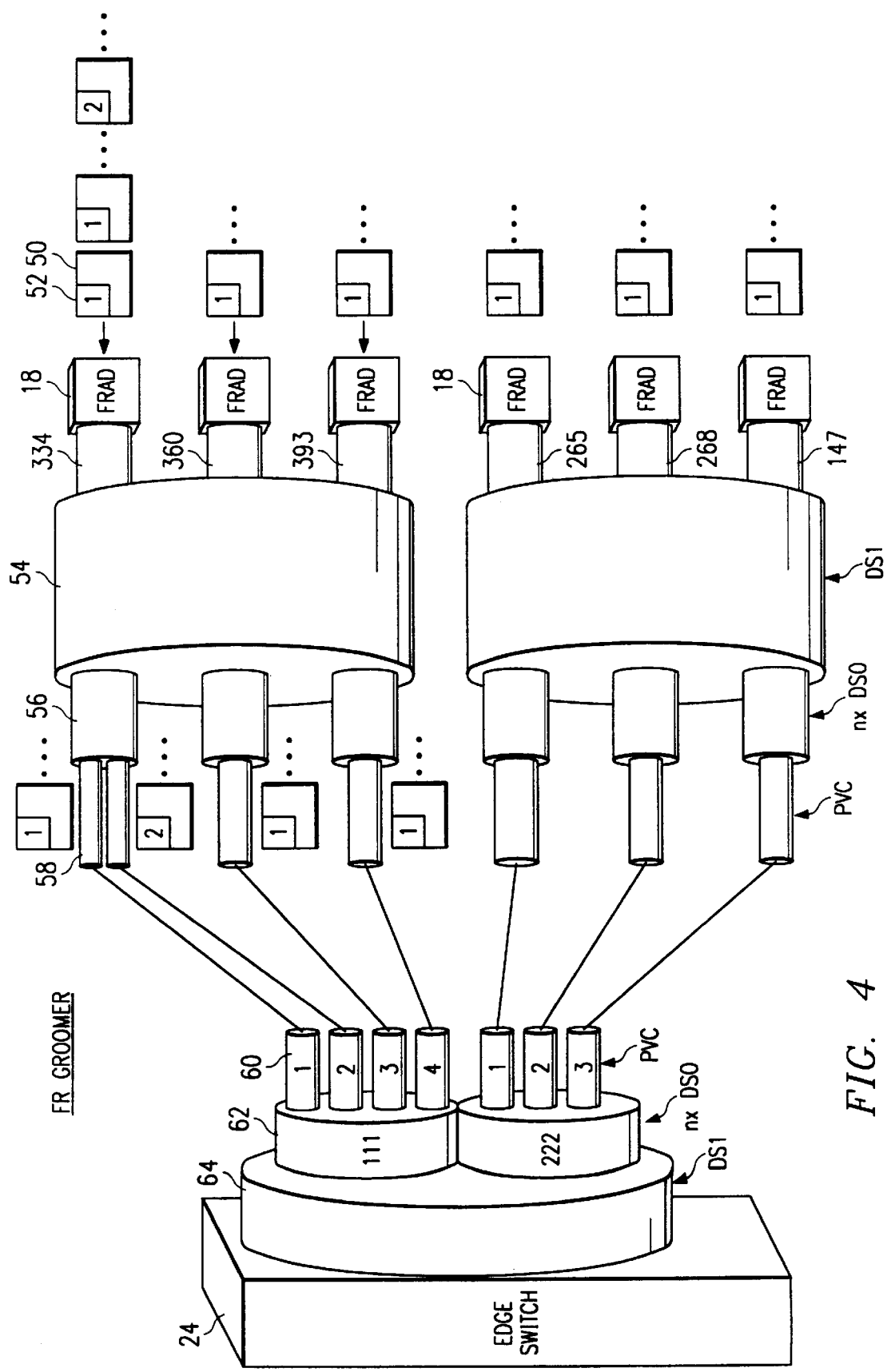
FIG. 4 illustrates the mapping performed by the frame groomer.

FIG. 4 shows the mapping performed by frame groomer 40 in consolidating frames of the frame relay information. During TDM provisioning on digital cross-connect system 10, frame groomer 40 through cross-connect manager 28 is provided information to identify physical circuits, such as T-1 links 14 and DS-0 signals, that carry frame relay traffic in and out of digital cross-connect system 10. During frame relay permanent virtual connection provisioning, frame groomer 40 receives standard frame relay control messages from edge switch 24 or by alternate network management connections that include data link connection identifier information associated with individual permanent virtual connections. Frame groomer 40 maps data link connection identifiers for edge switch 24 to data link connection identifiers for frame relay assembly/disassembly devices 18. Mapping and creation of data link connection identifiers is performed in frame groomer 40 through an internal mapping table. Table 1 shows an example of an internal mapping table for frame groomer 40.

TABLE 1

INTERNAL MAPPING TABLE

| INPUT TDM LINK | INPUT DLCI | OUTPUT TDM LINK | OUTPUT DLCI |
|---|---|---|---|
| 334 | 1 | 111 | 1 |
| 334 | 2 | 111 | 2 |
| 380 | 1 | 111 | 3 |
| 393 | 1 | 111 | 4 |
|  |  | 111 | MAX DLCI# |
| 265 | 1 | 222 | 1 |
| 268 | 1 | 222 | 2 |
| 149 | 1 | 222 | 3 |
| " | " | " | " |
| " | " | " | " |
| " | " | 222 | MAX DLCI# |

Using Table 1 as an example, frames 50 carried in DS-0 signals and each having their own DLCI 52 are received at digital cross-connect system 10 over input links 334, 380, and 393. The DS-0 signals from input links 334, 380, and 393 are consolidated into a DS-1 physical circuit 54 by cross-connect matrix 44. Logical circuits 56, each associated with one of the input links, within physical circuit 54 identified as carrying frame relay information are sent to frame groomer 40 over the internal bus of digital cross-connect system 10. Frame groomer 40 consolidates individual permanent virtual connections 58, each associated with a specific DLCI 52, from each logical circuit 56 and maps these individual permanent virtual connections 58 into permanent virtual connections 60 consolidated into a DS-0 logical circuit 62 associated with edge switch 24. DS-0 logical circuits 62 are placed into a DS-1 physical circuit 64 by frame groomer 40 and cross-connect matrix 44 for transfer to edge switch 24.

During a congestion situation, frame groomer 40 will initiate congestion management procedures. Congestion occurs when the input frame traffic associated with one or a group of permanent virtual connections associated with an output link exceeds the capacity of the output link. Upon this occurrence, frame groomer 40 will discard frames according to a priority order pre-determined by network administration. Frame groomer 40 initially discards frames tagged as discard eligible. Each frame carries a flag that determines whether the particular frame has been pre-determined as being eligible for discard. Next, frame groomer 40 discards frames associated with permanent virtual connections that have a committed information bit rate value of zero with no peak rate. Next, frame groomer 40 discards frames associated with permanent virtual connections that are exceeding their pre-defined peak rate. Next, frame groomer 40 discards frames associated with permanent virtual connections that are exceeding their pre-defined committed information rate value. Upon discarding a frame, frame groomer 40 sends a far end congestion notification message per frame relay standards. For congestion situations occurring in the network beyond edge switch 24 and/or in frame relay assembler/disassembler devices 18, frame groomer 40 transparently passes far end and back end congestion notification messages without taking any further action on these messages.

Figure 5:
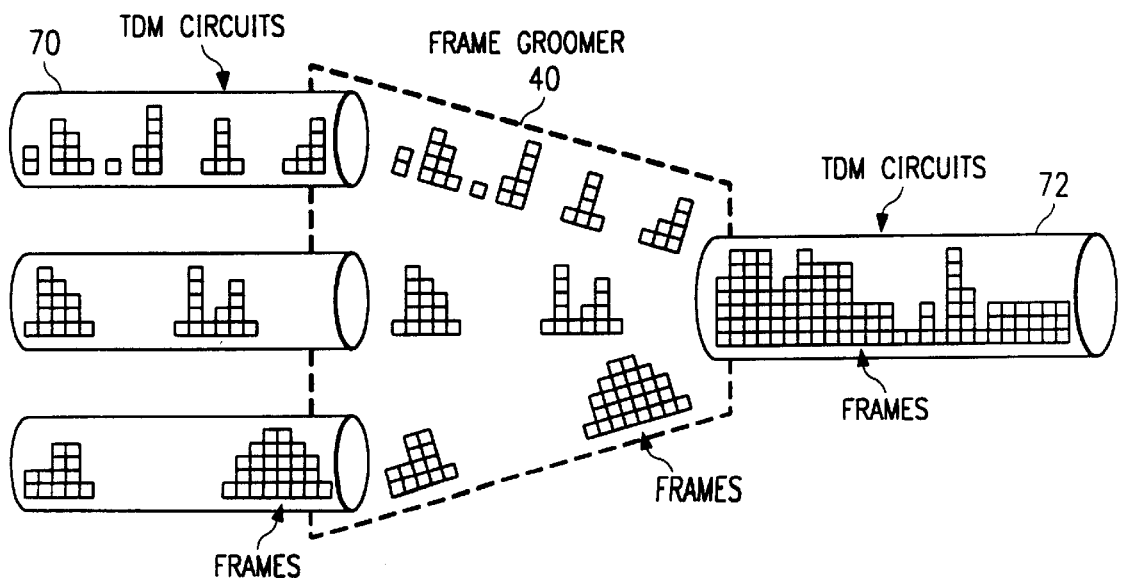
FIG. 5 illustrates how consolidation is performed by the frame groomer.

FIG. 5 shows an example of how consolidation is performed by digital cross-connect system 10. Digital cross-connect system 10 receives frame relay traffic from a plurality of time division multiplexed (TDM) circuit input links 70. Each TDM circuit input link 70 such as DS-0 signals carried over T-1 links 14 and FT-1 links 16, carries the frame relay traffic without being fully utilized. The bursty nature of the frame relay traffic controls the transfer rate and occupancy of the TDM circuit links. Digital cross-connect system 10, through frame groomer 40, accumulates the frame relay traffic from multiple TDM circuit input links for placement onto as few as one TDM circuit output link 72. TDM circuit output link 72 improves the efficiency of the under-utilized TDM circuit output links 70 by consolidating their frame relay traffic for improved circuit link utilization.

Thus, it is apparent that there has been provided, in accordance with the present invention, a system, device, and method for consolidating frame information on a minimum number of output links that satisfy the advantages set forth above. Although the present invention has been described in detail, it should be understood that various changes, substitutions, and alterations can be made herein. For example, though discussed in terms of frame relay information, the present invention can equally be incorporated into an asynchronous transfer mode system in order to consolidate asynchronous transfer mode cells received from multiple links for transfer onto as few as a single link. Other examples are readily ascertainable by one skilled in the art and can be made without departing from the spirit and scope of the present invention as defined by the following claims.

What is claimed is:

1. A digital cross-connect system, comprising:
    an input port operable to receive digital signal level zero telecommunications signals from a plurality of input links;
    a cross-connect matrix operable to consolidate the digital signal level zero telecommunications signals into a minimum number of Digital signal level one telecommunication signals;
    a groomer operable to identify asynchronous transfer mode cell traffic in the digital signal level zero telecommunications signals carried in the minimum number of Digital signal level one telecommunications signals, the groomer operable to consolidate the asynchronous transfer mode cell traffic into a minimum number of digital signal level zero telecommunications signals;
    an output port operable to transfer the minimum number of Digital signal level one telecommunications signals carrying the consolidated asynchronous transfer mode cell traffic in the minimum number of digital signal level zero telecommunications signals onto an output link.

2. The digital cross-connect system of claim 1, wherein the groomer maps the plurality of input links to the output link in order to consolidate the asynchronous transfer mode cell traffic.

3. The digital cross-connect system of claim 1, wherein the asynchronous transfer mode cell traffic includes a plurality of asynchronous transfer mode cells, each asynchronous transfer mode cells having a virtual path/virtual circuit identifier, the groomer mapping virtual path/virtual circuit identifiers corresponding to the plurality of input links to virtual path/virtual circuit identifiers corresponding to the output link.

4. The digital cross-connect system of claim 3, wherein the groomer maintains an internal mapping table that associates virtual path/virtual circuit identifiers of the plurality of input links to virtual path/virtual circuit identifiers of the output link.

5. The digital cross-connect system of claim 3, wherein each virtual path/virtual circuit identifier corresponds to a virtual path/virtual circuit, the groomer generating a correspondence of the virtual paths/virtual circuits associated with the input links to the virtual paths/virtual circuits associated with the output link.

6. The digital cross-connect system of claim 1, further comprising a switch operable to receive consolidated asynchronous transfer mode cell traffic from the groomer, the switch operable to transfer the consolidated asynchronous transfer mode cell traffic at a higher bandwidth than the output port.

7. The digital cross-connect system of claim 6, wherein the switch places the consolidated asynchronous transfer mode cell traffic into a digital signal level three telecommunications signal.

8. The digital cross-connect system of claim 1, wherein the plurality of input links include T-1 trunks carrying individual digital signal level zero telecommunications signals and FT-1 trunks carrying multiple digital signal level zero telecommunications signals.

9. The digital cross-connect system of claim 1, wherein the groomer is operable to discard individual asynchronous transfer mode cells of the asynchronous transfer mode cell traffic according to a pre-determined priority when a capacity of the output port has been exceeded.

10. The digital cross-connect system of claim 9, wherein each asynchronous transfer mode cell includes a flag to indicate a discard eligibility.

11. A method of consolidating frame relay traffic, comprising steps of:
    receiving digital signal level zero telecommunications signals from a plurality of input ports;
    consolidating the digital signal level zero telecommunications signals into a minimum number of Digital signal level one telecommunications signals;
    identifying asynchronous transfer mode cell traffic from consolidated digital signal level zero telecommunications signals;
    consolidating the asynchronous transfer mode cell traffic into a minimum number of digital signal level zero telecommunications signals;
    transferring the minimum number of Digital signal level one telecommunications signals carrying consolidated asynchronous transfer mode cell traffic in the minimum number of digital signal level zero telecommunications signals onto an output port.

12. The method of claim 11, wherein the asynchronous transfer mode cell traffic consolidating step includes mapping virtual paths/virtual circuits associated with the plurality of input ports to virtual paths/virtual circuits associated with the output port.

13. The method of claim 12, wherein the asynchronous transfer mode cell traffic includes a plurality of asynchronous transfer mode cells, each asynchronous transfer mode cell having a virtual path/virtual circuit identifier, wherein the mapping step includes associating the virtual path/virtual circuit identifier of each asynchronous transfer mode cell of the asynchronous transfer mode cell traffic carried on each input port to a virtual path/virtual circuit identifier associated with the output port.

14. The method of claim 11, further comprising a step of:
    placing the digital signal level one telecommunications signal into a digital signal level three telecommunications signal to provide higher bandwidth capability.

15. The method of claim 11, further comprising a step of:
    discarding individual asynchronous transfer mode cells of the asynchronous transfer mode cells traffic according to a pre-determined priority in response to a capacity of the output port being exceeded.

16. A method of processing telephony traffic, comprising steps of:
    receiving telephony traffic from a plurality of input links;
    consolidating the telephony traffic received from each of the plurality of input links into a minimum number of traffic carriers;
    identifying types of specific traffic within the telephony traffic;
    consolidating the telephony traffic by specific traffic type into a minimum number of telecommunications signals carried by the minimum number of traffic carriers;
    placing the minimum number of traffic carriers carrying the minimum number of telecommunications signals onto an output link.

17. The method of claim 16, further comprising a step of:
    mapping permanent virtual connections of each input link to permanent connections of the output link.

18. The method of claim 16, further comprising a step of:
    associating a digital link connection identifier within each portion of the specific traffic received from the plurality of input ports to digital link virtual path/virtual circuit connection identifiers associated with the output port.

19. The method of claim 16, further comprising a step of:
mapping permanent virtual path/virtual circuits of each input link to permanent virtual path/virtual circuits of the output link.

20. The method of claim 16, further comprising a step of:
associating a virtual path/virtual circuit identifier within each portion of the specific traffic received from the plurality of input ports to virtual path/virtual circuit identifiers associated with the output port.

21. The method of claim 16, further comprising a step of:
discarding portions of the specific traffic according to a pre-determined priority order in an event of congestion between the plurality of input links and the output link.

22. The method of claim 21, further comprising a step of:
assigning a discard eligibility and a discard priority to each portion of the specific traffic.

23. The method of claim 16, wherein the specific traffic is frame relay traffic and the traffic carrier is a digital signal level one telecommunications signal.

24. The method of claim 16, wherein the specific traffic is frame relay traffic and the traffic carrier is a digital signal level one telecommunications signal.

25. The method of claim 16, wherein the specific traffic is asynchronous transfer mode cells and the traffic carrier is a digital signal level one telecommunications signal.

26. The method of claim 16, wherein the specific traffic is asynchronous transfer mode cells and the traffic carrier is a digital signal level one telecommunications signal.

27. The method of claim 16, wherein the specific traffic is frame relay traffic and the traffic carrier is a J1 telecommunications signal.

28. The method of claim 16, wherein the specific traffic is asynchronous transfer mode cells and the traffic carrier is a J1 telecommunications signal.

* * * * *